United States Patent
Patwari et al.

(10) Patent No.: US 8,195,897 B2
(45) Date of Patent: Jun. 5, 2012

(54) MIGRATING MEMORY DATA BETWEEN PARTITIONS

(75) Inventors: Veena Patwari, Austin, TX (US); Vasu Vallabhaneni, Austin, TX (US); Morgan Jeffrey Rosas, Cedar Park, TX (US); James A Pafumi, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 976 days.

(21) Appl. No.: 12/135,422

(22) Filed: Jun. 9, 2008

(65) Prior Publication Data

US 2009/0307456 A1 Dec. 10, 2009

(51) Int. Cl.
 *G06F 12/00* (2006.01)
(52) U.S. Cl. ............... 711/153; 711/173; 711/E12.002; 711/165
(58) Field of Classification Search .......... 711/165, 711/162, 147, 148, 170, 173, E12.002, E12.001, 711/153; 714/E11.112, 54
See application file for complete search history.

(56) References Cited

U.S. PATENT DOCUMENTS

| | | | |
|---|---|---|---|
| 5,708,790 A | 1/1998 | White et al. | |
| 5,765,210 A | 6/1998 | Greenstein et al. | |
| 6,920,555 B1 | 7/2005 | Peters et al. | |
| 7,085,890 B2 | 8/2006 | Kashyap | |
| 7,142,891 B2 | 11/2006 | Shankar et al. | |
| 7,213,115 B2 | 5/2007 | Sato et al | |
| 7,257,811 B2* | 8/2007 | Hunt et al. | 718/1 |
| 7,281,104 B1 | 10/2007 | Tsypliaev et al. | |
| 7,783,763 B2* | 8/2010 | Tuel | 709/228 |
| 7,797,500 B1* | 9/2010 | Lewis et al. | 711/162 |
| 7,849,278 B2* | 12/2010 | Sato et al. | 711/161 |
| 2005/0204366 A1* | 9/2005 | Billau et al. | 719/324 |
| 2006/0095700 A1* | 5/2006 | Sato et al. | 711/165 |
| 2008/0046671 A1 | 2/2008 | Sato et al. | |
| 2008/0065826 A1* | 3/2008 | Recio et al. | 711/113 |
| 2008/0256327 A1* | 10/2008 | Jacobs et al. | 711/207 |
| 2009/0007147 A1* | 1/2009 | Craft et al. | 719/320 |

* cited by examiner

*Primary Examiner* — Pierre-Michel Bataille
(74) *Attorney, Agent, or Firm* — Garg Law Firm, PLLC; Rakesh Garg; David Mims (57) ABSTRACT

A method, system, and computer usable program product for migrating memory data between partitions are provided in the illustrative embodiments. All or a portion of a memory data of the source partition is written to a data storage unit, which may be a shared paging space, or a shared area of a data storage unit other than a paging space. The writing uses a first data communication path configured for paging the memory data. The portion of the memory data from the data storage unit is read at a destination partition. The reading uses a second data communication path configured for paging a second memory data. The read portion of the memory data may be used for executing a migrated application. The writing and reading may use a third and a fourth data communication paths respectively that may be configured for paging memory data to the shared area.

18 Claims, 5 Drawing Sheets

MIGRATING MEMORY DATA BETWEEN PARTITIONS

BACKGROUND OF THE INVENTION

1. Field of the Invention:

The present invention relates generally to an improved data processing system, and in particular, to a computer implemented method for transferring data. Still more particularly, the present invention relates to a computer implemented method, system, and computer usable program code for migrating memory data between partitions.

2. Description of the Related Art:

Data processing systems can be divided into logical partitions (LPAR). Each logical partition operates as a separate data processing system independent of the other logical partitions. Generally, a partition management firmware connects the various logical partitions and provides the network connectivity among them. Hypervisor is an example of such partition management firmware.

Occasionally, a need may arise to mobilize or migrate one logical partition to another logical partition. Mobilizing or migrating is the process of moving from one location to another. Mobilizing a logical partition is migrating the applications and processes on the logical partition to another logical partition. Migrating the applications and processes includes migrating the data associated with those applications and processes from one logical partition—the source logical partition—to another logical partition—the destination logical partition. Migrating such data includes relocating data residing on any persistent data storage, such as hard disks. Migrating such data also includes relocating data in memory for any applications or processes that may be executing on the source partition at the time of mobilizing the source partition.

Data in memory includes data addressable by virtual address space of a logical partition. In migrating memory data of a source logical partition to a destination logical partition, a need for migrating the data located in the paging space of the source logical partition may also arise. Paging space is the data storage, often an area allocated on a persistent storage, where data from the memory may be temporarily removed to make space available in the memory. Migrating memory data includes migrating data in the paging space.

Present method for migrating memory data between partitions is slow and vulnerable to a compromise of the data being migrated. Therefore, an improved system, method, and product for migrating memory data between partitions will be desirable.

SUMMARY OF THE INVENTION

The illustrative embodiments provide a method, system, and computer usable program product for migrating memory data between partitions.

A component associated with a source logical partition writes a portion of a memory data of the source logical partition to a data storage unit. The writing uses a first data communication path configured for paging the memory data. A second component associated with a destination logical partition reads at the destination logical partition the portion of the memory data from the data storage unit. The reading occurs using a second data communication path configured for paging a second memory data. Another component associated with the destination logical partition uses the portion of the memory data for executing a migrated application.

The memory data can be all the memory data or a part of the memory data. The data storage unit may be a paging space, and the paging space may be accessible from the source logical partition and the destination logical partition.

In another embodiment, the data storage unit may be a shared area of a data storage unit that is distinct from a first paging space of the source logical partition and from a second paging space of the destination logical partition. The shared area of the data storage unit may be accessible from the source logical partition and the destination logical partition.

The writing may use a third data communication path configured for paging the memory data to the shared area of the data storage unit, and the reading may use a fourth data communication path configured for paging the second memory data to the shared area of the data storage unit.

A component associated with the source logical partition may page in the portion of the memory data from the first paging space. A component associated with the destination logical partition may page out the portion of the memory data to the second paging space.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The illustrative embodiments described herein provide a method, system, and computer usable program product for migrating memory data between partitions. The illustrative embodiments are sometimes described herein using particular technologies only as an example for the clarity of the description. The illustrative embodiments may be used for migrating memory data from one logical partition to another in a variety of data processing system partitioning architectures.

Presently, users use data networks that are external to the data processing system when migrating memory data from a source logical partition to a destination logical partition. For example, users may use the local area network that connects two logical partitions via their associated network adapters.

The illustrative embodiments recognize that using external data networks for migrating memory data causes the migration to be limited by the speed of the external data network. For example, other data processing systems that may be using the external data network may degrade the performance of that network, affecting the speed of memory data migration.

The illustrative embodiments also recognize that in many cases, the mobilization of a source logical partition may occur while the source logical partition is operational, with applications and processes executing thereon. An application may be suspended, paused, or delayed while the data in memory pertaining to that application migrates from the source logical partition to the destination logical partition. Once the data is available at the destination logical partition, the application may resume operation and the users of the application may not notice that the application has migrated to a different logical partition.

The illustrative embodiments recognize that in such cases, for example, degraded network performance may cause errors in an application if the network delay exceeds a threshold delay that the application may tolerate. As another example, data passing over external data networks may be susceptible to intrusion by unauthorized persons.

To address these and other problems related to migrating memory data, the illustrative embodiments provide a method, system, and computer usable program product for migrating memory data between partitions. The illustrative embodiments are described in some instances using particular data processing environments only as an example for the clarity of the description. The illustrative embodiments may be used in conjunction with other comparable or similarly purposed architectures for deploying and managing logical partitions.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 1:
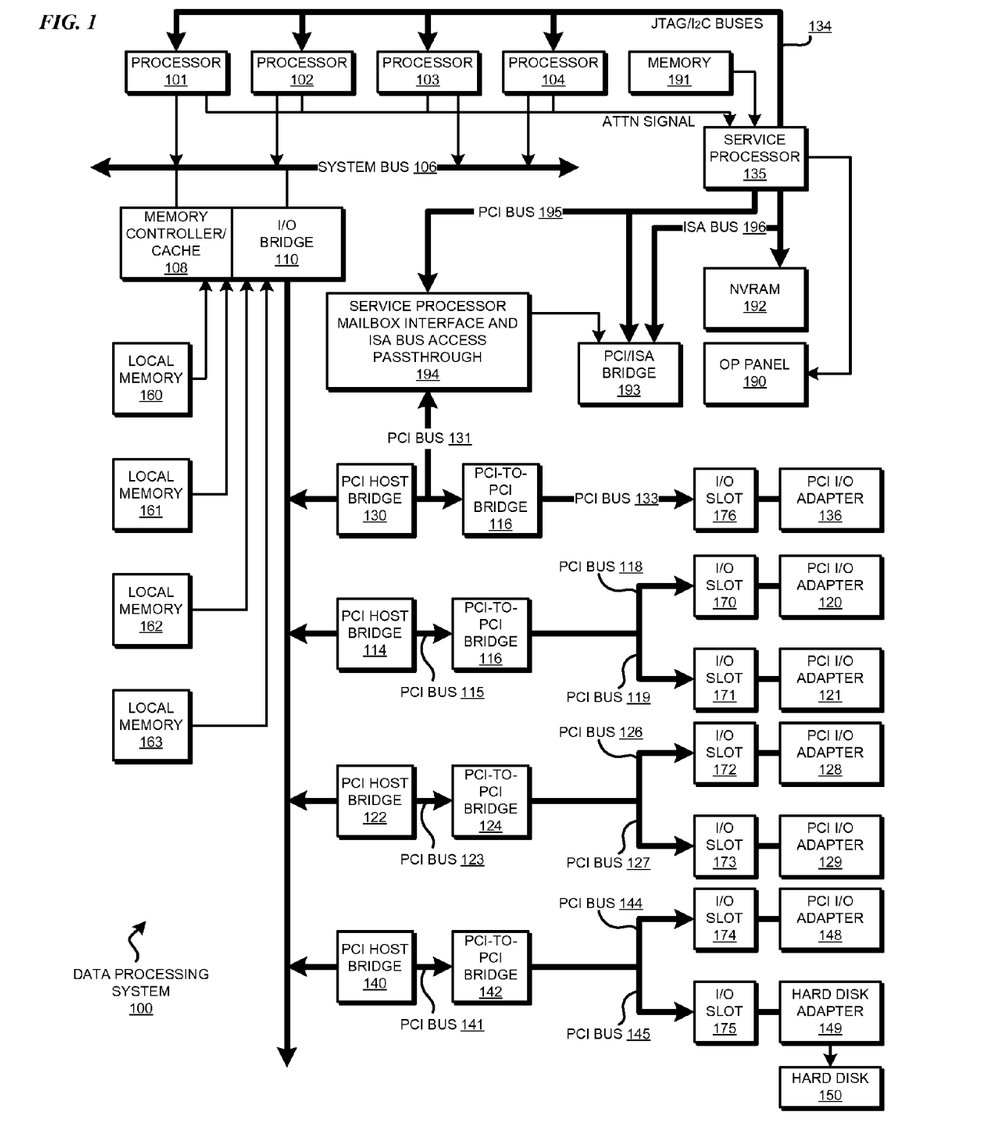
FIG. 1 depicts a block diagram of a data processing system in which the illustrative embodiments may be implemented is depicted.
Figure 2:
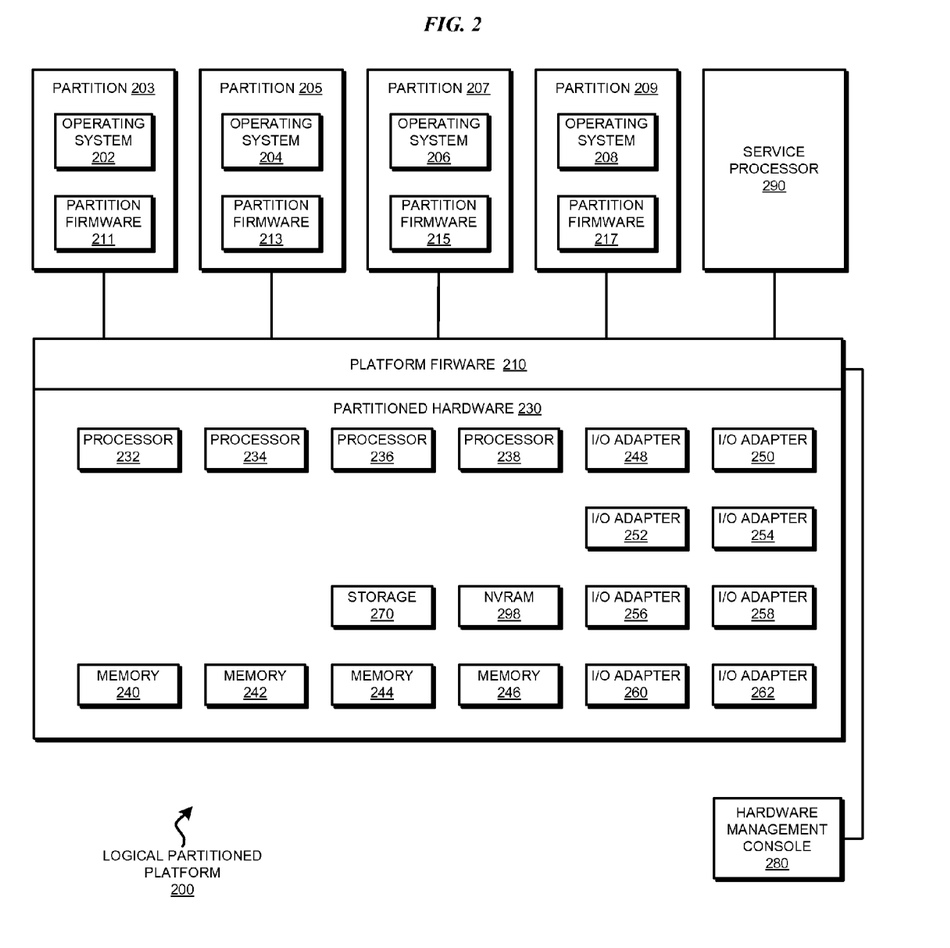
FIG. 2 depicts a block diagram of an exemplary logical partitioned platform in which the illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

With reference to FIG. 1, this figure depicts a block diagram of a data processing system in which the illustrative embodiments may be implemented is depicted. Data processing system 100 may be a symmetric multiprocessor (SMP) system including a plurality of processors 101, 102, 103, and 104, which connect to system bus 106. For example, data processing system 100 may be an IBM eServer® implemented as a server within a network. (eServer is a product and e(logo)server is a trademark of International Business Machines Corporation in the United States and other countries). Alternatively, a single processor system may be employed. Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Data processing system 100 is a logical partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 connects for a display device (not shown), while hard disk adapter 149 connects to and controls hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX®) operating system may be executing within partition P1, a second instance (image) of the AIX operating system may be executing within partition P2, and a Linux® or OS/400® operating system may be operating within logical partition P3. (AIX and OS/400 are trademarks of International business Machines Corporation in the United States and other countries. Linux is a trademark of Linus Torvalds in the United States and other countries).

Peripheral component interconnect (PCI) host bridge 114 connected to I/O bus 112 provides an interface to PCI local bus 115. A number of PCI input/output adapters 120-121 connect to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 connects to a plurality of PCI I/O adapters 128-129. PCI I/O adapters 128-129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

A PCI host bridge 130 provides an interface for a PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101-104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I$^2$C busses 134 to interrogate the system (host) processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the illustrative embodiments.

With reference to FIG. 2, a block diagram of an exemplary logical partitioned platform is depicted in which the illustrative embodiments may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor. OS/400 is used only as an example in these illustrative embodiments. Of course, other types of operating systems, such as AIX and Linux, may be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

The hardware in FIGS. 1-2 may vary depending on the implementation. Other internal hardware or peripheral devices, such as flash memory, equivalent non-volatile memory, or optical disk drives and the like, may be used in addition to or in place of certain hardware depicted in FIGS. 1-2. An implementation of the illustrative embodiments may also use alternative architecture for managing partitions without departing from the scope of the illustrative embodiments.

Figure 3:
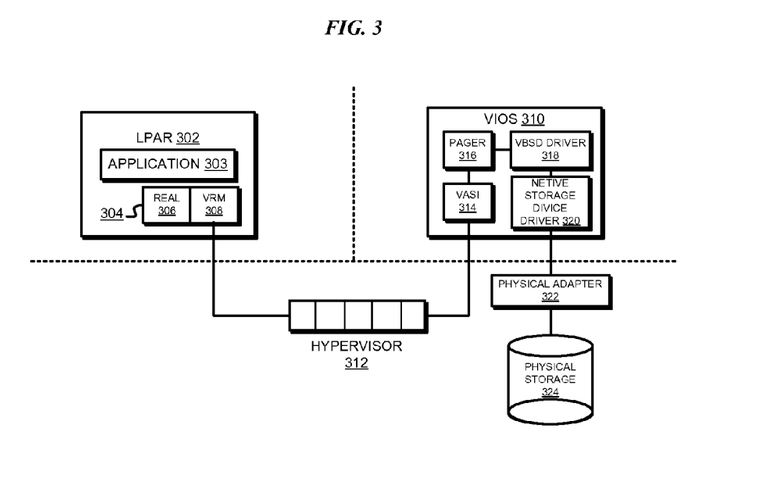
FIG. 3 depicts a block diagram of using memory in logical partitions in which the illustrative embodiments may be implemented.

With reference to FIG. 3, this figure depicts a block diagram of using memory in logical partitions in which the illustrative embodiments may be implemented. logical partition 302 may be implemented using any of logical partitions 203, 205, 207, or 209 in FIG. 2. logical partition 302 may have application 303 executing thereon and utilizing memory 304. Memory 304 may be partly implemented using any of memory 160, 161, 162, or 163 in FIG. 1.

Memory 304 may also include virtual real memory (VRM). Virtual real memory is a firmware solution for memory usage in a logical partitioned data processing system that allows multiple logical partitions to share physical memory with minimal changes to the operating system running in those partitions. Memory data for the purposes of the illustrative embodiments may be stored in any part of memory 304. In other words, the memory data for the illustrative embodiments may be stored in any real memory dedicated to logical partition 302, such as real memory 306, or in any virtual real memory associated with logical partition 302, such as virtual real memory 308.

Virtual input/output server (VIOS) 310 is a component that manages the input output requests involving the data in memory 304 of logical partition 302. A system for managing the logical partitions, such as Hypervisor 312, facilitates communication between logical partition 302 and virtual I/O server 310.

Virtual asynchronous services interface 314 (VASI), a component of virtual I/O server 310, accepts the commands for virtual I/O server 310 so that virtual I/O server 310 may execute those commands. In this example depiction, virtual asynchronous services interface 314 may be a component, such as a virtual device, that accepts commands from Hypervisor 312 or a comparable system.

virtual asynchronous services interface 314 may forward the commands to appropriate kernel extensions in virtual I/O server 310. The kernel extensions may then execute the commands on behalf of hypervisor 312. In one embodiment, a paging device, such as pager 316, may be a kernel extension that may receive the commands from virtual asynchronous services interface 314. Pager 316 may be responsible for satisfying paging requests from hypervisor 312. A paging request is a type of command for reading or writing a block or page of data.

In one embodiment, pager 316 may satisfy a paging request by either reading from or writing to a memory buffer of any kind. In another embodiment, pager 316 may also satisfy a paging request by reading from or writing to another type of block data storage by making calls to virtual block storage device (VBSD) driver 318. In another embodiment, pager 316 may read from or write to a combination of data storages.

Virtual block storage device driver 318 may be a component associated with a data storage device that manages I/O requests made by other kernel extensions, such as pager 316, within virtual I/O server 310. For example, virtual block storage device driver 318 may communicate with native storage device driver 320, which may communicate with physical adapter 322 associated with physical storage 324, to process data I/O commands received from Hypervisor 312.

Thus, through the sequence of processing and handling of read/write requests for memory data as described above, logical partition 302 may support the memory needs of application 303 executing thereon. In this manner an internal path for moving memory data may be created in logical partitioned data processing systems. This internal path is also called a paging channel, or memory paging channel. The components and functions of those components described in FIG. 3 are described only as an example and are not limiting on the illustrative embodiments. An implementation may modify the chain of components and functions for allowing memory access to applications executing on logical partitions without departing from the scope of the illustrative embodiments.

Figure 4:
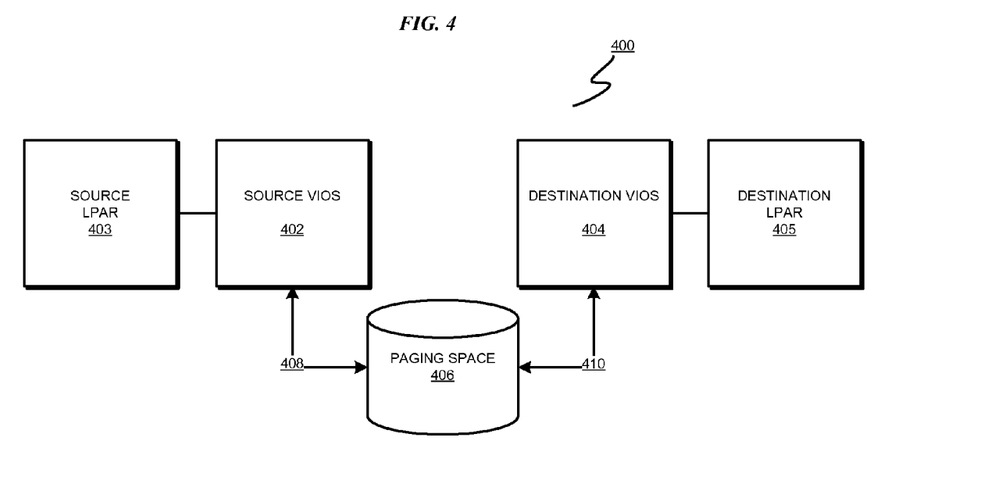
FIG. 4 depicts a block diagram of a system for migrating memory data between logical partitions in accordance with an illustrative embodiment.

With reference to FIG. 4, this figure depicts a block diagram of a system for migrating memory data between logical partitions in accordance with an illustrative embodiment. Logical partitioned data processing system 400 may include two or more logical partitions as described in FIG. 2, between which memory data is to be migrated.

Source virtual I/O server 402 may be a virtual I/O server associated with source logical partition 403 from where the memory data is to be migrated. Destination virtual I/O server 404 may be a virtual I/O server associated with destination logical partition 405 to where the memory data is to be migrated. Source virtual I/O server 402 and destination virtual I/O server 404 may each be implemented using virtual I/O server 310 in FIG. 3. Each of logical partitions 403 and 405 may be implemented using logical partition 302 in FIG. 3.

Paging space 406 may be implemented using physical storage 324 in FIG. 3. Paging space 406 may be an allocated area in a physical storage device where a logical partition may read or write pages of data belonging to the logical partition.

Source virtual I/O server 402 may read and write memory data of source logical partition 403 to and from paging space 406 using path 408. Path 408 may be a communication path including one or more components. As an example, path 408 may be analogous to the internal path of FIG. 3 that includes virtual asynchronous services interface 314, pager 316, virtual block storage device driver 318, native storage device driver 320, and physical adapter 322, that couples virtual I/O server 310 to physical storage 324 in FIG. 3.

Destination virtual I/O server 404 may access paging space 406 in a similar manner for destination logical partition 405 using path 410. Path 410 may be analogous to path 408.

A physical storage device, such as a hard disk, may include paging space for several logical partitions. Generally, only the logical partition that has been allocated a paging space may access that paging space. Separate logical partitions may have separate paging spaces allocated on them, and may access their respective paging spaces.

In accordance with an illustrative embodiment, source virtual I/O server 402 and destination virtual I/O server 404 may be configured to have access to a common paging space, namely paging space 406. In other words, source virtual I/O server 402 may read and write to paging space 406, as may destination virtual I/O server 404.

By configuring source virtual I/O server 402, destination virtual I/O server 404, and paging space 406 over internal paths 408 and 410 in this manner, the illustrative embodiment facilitates an improved migration of memory data between source logical partition 403 and destination logical partition 405. Source virtual I/O server 402 transfers or pages out to paging space 406 the memory data of source logical partition 403 that has to be migrated to destination logical partition 405. Correspondingly, for destination logical partition 405, destination virtual I/O server 404 transfers or pages in from paging space 406 the memory data that source virtual I/O server 402 paged out.

Once the paging out and paging in operations are complete, the memory data of source logical partition 403 has been migrated to destination logical partition 405. By migrating the memory data in this manner, the illustrative embodiments avoid using external data networks. Thus, the illustrative embodiments may improve the speed, reliability, and security of migrating memory data between logical partitions as compared to presently existing methods for memory migration.

Figure 5:
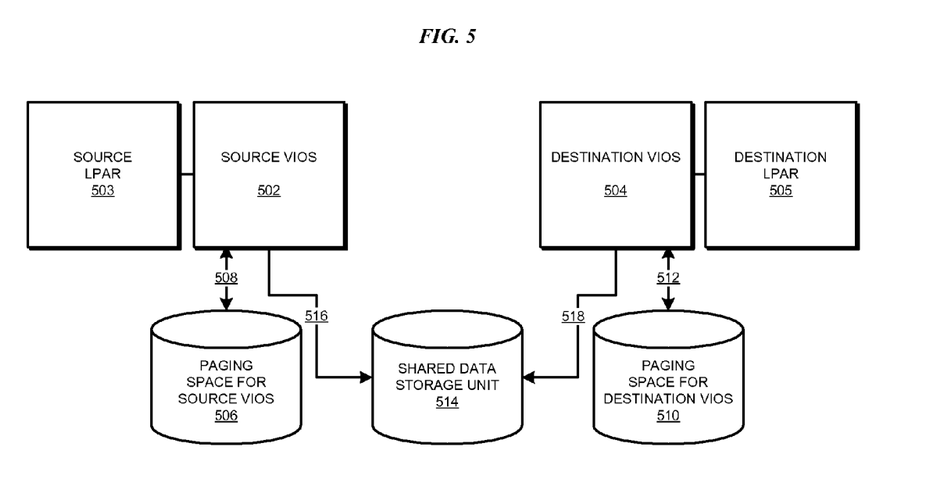
FIG. 5 depicts a block diagram of another system for migrating memory data between logical partitions in accordance with an illustrative embodiment.

With reference to FIG. 5, this figure depicts a block diagram of another system for migrating memory data between logical partitions in accordance with an illustrative embodiment. Logical partitioned data processing system 500 may include two or more logical partitions as described in FIG. 2, between which memory data is to be migrated.

Source virtual I/O server 502 may be a virtual I/O server associated with source logical partition 503 from where the memory data is to be migrated. Destination virtual I/O server 504 may be a virtual I/O server associated with destination logical partition 505 to where the memory data is to be migrated. Source virtual I/O server 502 and destination virtual I/O server 504 may each be implemented using source virtual I/O server 402 and destination virtual I/O server 404 respectively in FIG. 4. logical partitions 503 and 505 may be analogous to logical partitions 403 and 405 respectively in FIG. 4.

In some instances, as described above, only the logical partition to which a paging space has been allocated may access that paging space. In such instances, shared access to a paging space may not be possible or desirable. Source virtual I/O server 502 may read and write memory data for logical partition 503 to paging space 506. Source virtual I/O server 502 may access paging space 506 over path 508, which may be analogous to path 408 in FIG. 4. Destination virtual I/O server 504 may read and write memory data for logical partition 505 to paging space 510. Destination virtual I/O server 504 may access paging space 510 over path 512, which may be analogous to path 410 in FIG. 4. Paging spaces 506 and 510 may each be implemented using one or more physical storage 324 in FIG. 3.

Source virtual I/O server may further transfer or page out the memory data of source logical partition 503 to shared data storage unit 514 over path 516. Shared data storage unit 514 may be a persistent storage device, such as a hard disk, that may be accessible to source virtual I/O server 502 in a manner similar to the paging space 506. For example, assume that path 508 includes components similar to virtual asynchronous services interface 314, pager 316, virtual block storage device driver 318, native storage device driver 320, and physical adapter 322 in FIG. 3. This configuration would enable source virtual I/O server 502 to have access to paging space 506. Now assume, as an example in accordance with an illustrative embodiment, that path 506 also includes a second native storage device driver and a second physical adapter to a second storage device. Now, a second path—path 516—may exist to a second storage device in addition to the first path—path 508—to paging space 506. Source virtual I/O server 502 may be able to read and write source logical partition 503's memory data to a second data storage device, such as shared data storage unit 514, over the second path, path 516.

Destination virtual I/O server 504 may be configured in a manner similar to source virtual I/O server 502 such that destination virtual I/O server 504 can access a storage device other than paging space 510. Further, destination virtual I/O server 504 may be configured such that the other path is path 518 to shared data storage unit 514.

Configured in this manner according to the illustrative embodiment, source logical partition 503 and destination logical partition 505 can maintain exclusive access to their respective paging spaces without sharing a paging space. Yet, by this configuration, source virtual I/O server 502 and destination virtual I/O server 504 can read and write from a data storage with shared access.

By configuring source virtual I/O server 402, destination virtual I/O server 404, and shared data storage unit 514 over internal paths 516 and 518 in this manner, the illustrative embodiment facilitates an improved migration of memory data between source logical partition 503 and destination logical partition 505. Source virtual I/O server 502 transfers or pages out to shared data storage unit 514 the memory data of source logical partition 503 that has to be migrated to destination logical partition 505. Correspondingly, for destination logical partition 505, destination virtual I/O server 504 transfers or pages in from shared data storage unit 514 the memory data that source virtual I/O server 502 paged out.

Once the paging out and paging in operations are complete, the memory data of source logical partition 503 has been migrated to destination logical partition 505. By migrating the memory data in this manner, the illustrative embodiments again avoid using external data networks. Thus, the illustrative embodiments may improve the speed, reliability, and security of migrating memory data between logical partitions as compared to presently existing methods for memory migration.

Figure 6:
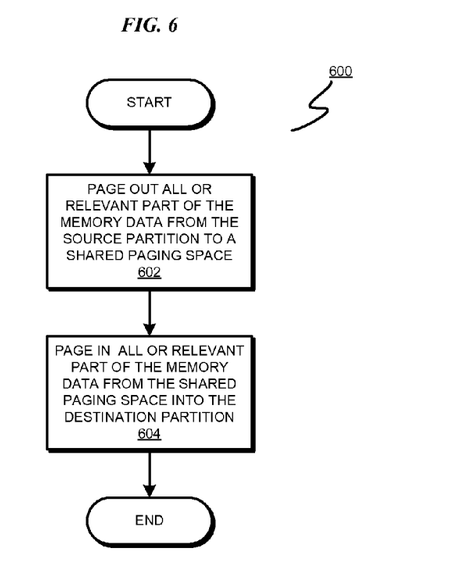
FIG. 6 depicts a flowchart of a process of migrating memory data between logical partitions in accordance with an illustrative embodiment.

With reference to FIG. 6, this figure depicts a flowchart of a process of migrating memory data between logical partitions in accordance with an illustrative embodiment. Process 600 may be implemented in logical partitioned data processing system 400 in FIG. 4.

Process 600 pages out all or relevant part of the memory data from the source logical partition to a shared paging space (step 602). Process 600 performs step 602 using an internal path between logical partitions as described with respect to path 408 in FIG. 4.

In some implementations, only a part of the memory data may be migrated from one logical partition to another. For example, when only a certain application executing on a source logical partition have to be migrated to a destination logical partition, only that portion of the memory data may be migrated as may be relevant to that application.

Process 600 pages in all or relevant part of the memory data that was written in step 602 from the shared paging space to the destination logical partition (step 604). Process 600 ends thereafter. Process 600 performs step 604 using an internal path between logical partitions as described with respect to path 410 in FIG. 4.

Figure 7:
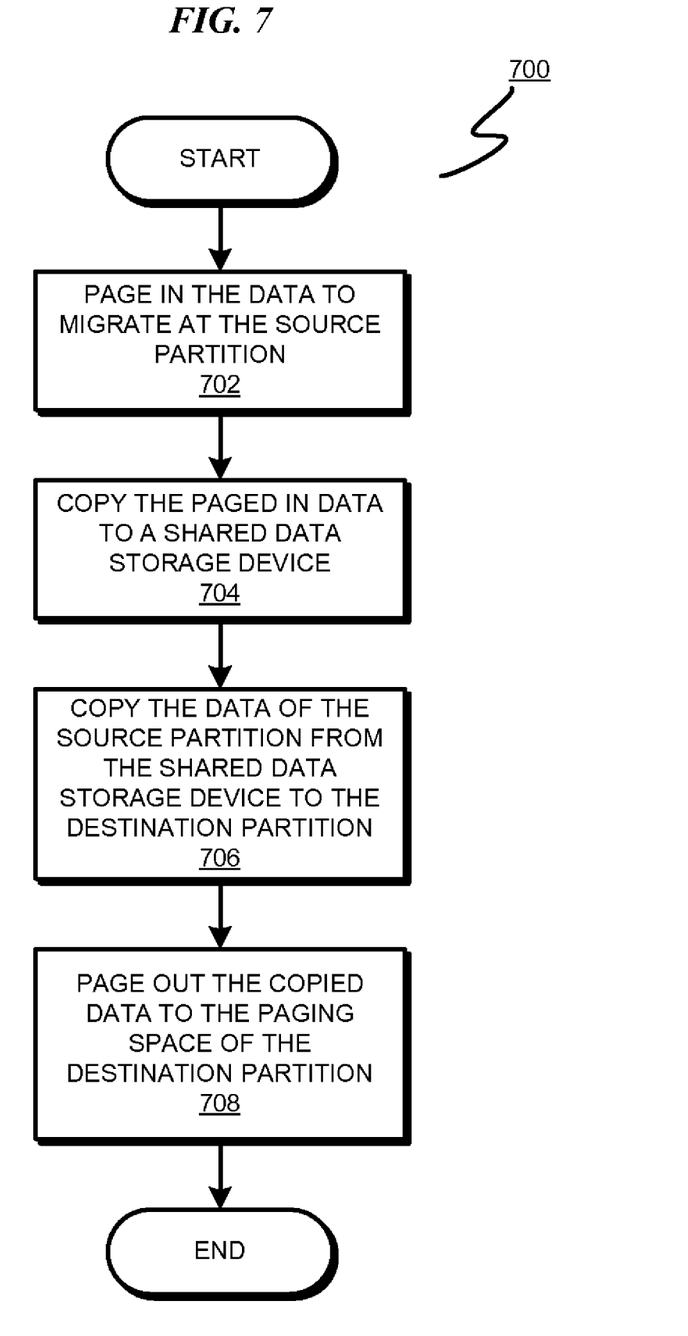
FIG. 7 depicts a flowchart of another process of migrating memory data between logical partitions in accordance with an illustrative embodiment.

With reference to FIG. 7, this figure depicts a flowchart of another process of migrating memory data between logical partitions in accordance with an illustrative embodiment. Process 700 may be implemented in logical partitioned data processing system 500 in FIG. 5.

Process 700 may begin by paging in all or relevant part of the memory data that has to be migrated (step 702). In step 702, the memory data that is to be migrated may be located in a source partition's paging space and may have to be paged in so that the memory data may be paged out to a shared data storage unit. For example, source virtual I/O server 502 may page in the memory data from paging space for source virtual I/O server 506 in FIG. 5 using step 702. In some implementations, such as when the memory data that is to be migrated already exists in memory, step 702 may be omitted.

Process 700 copies, transfers, or pages out the paged in data to a shared data storage device (step 704). For example, source virtual I/O server 502 may transfer the memory data to shared data storage unit 514 over path 516 in FIG. 5 using step 704.

Process 700 copies, transfers, or pages in the memory data of step 704 from the shared data storage device to the destination partition (step 706). For example, destination virtual I/O server 504 may transfer the memory data from shared data storage unit 514 over path 518 in FIG. 5 using step 706.

Process 700 may page out the copied memory data of step 706 to another paging space (step 708). Process 700 ends thereafter. For example, destination virtual I/O server 504 may page out the copied data to paging space for destination virtual I/O server 510 in FIG. 5 using step 708. In some implementations, such as when the copied data is to be used immediately upon migrating, step 708 may be omitted.

The components in the block diagrams and the steps in the flowcharts described above are described only as examples. The components and the steps have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the illustrative embodiments.

Thus, a computer implemented method, apparatus, and computer program product are provided in the illustrative embodiments for migrating memory data between partitions. Using the illustrative embodiments, all or a portion of the memory data belonging to one logical partition may be migrated to another logical partition without using external data networks such as the Internet, LAN, WAN, Ethernet, or other internet protocol (IP) based data networks.

The illustrative embodiments use data communication channels that are used for paging memory data to and from a paging space to accomplish the memory data migration. A source logical partition pages out the memory data that is to be migrated to a shared paging space or a shared data storage unit. A destination logical partition pages in that paged out data.

By migrating the memory data in this manner, the illustrative embodiments may improve the speed of migration because the speed of paging data in and out of paging space is generally faster compared to sending data over IP networks. Furthermore, the illustrative embodiments may improve the reliability of the memory data transfer, as there is no risk of packet loss as in IP networks when transferring data over memory paging channels of logical partitions.

Additionally, the illustrative embodiments may improve the security of the memory data while in transit over the paging channels as compared to transmitting memory data over external networks. This improvement may be because the paging channels are internal to the logical partitioned data processing system and therefore not as vulnerable to attacks and infiltration by unauthorized persons as are external data networks.

The invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for migrating memory data between partitions, the computer implemented method comprising:

writing a portion of a memory data of a source logical partition to a data storage unit, the writing occurring using a first data communication path configured for paging the memory data, wherein the data storage unit is a shared area of a data storage unit that is distinct from a first paging space of the source logical partition and from a second paging space of the destination logical partition, and wherein the shared area of the data storage unit is accessible from the source logical partition and the destination logical partition;

reading the portion of the memory data from the data storage unit at a destination logical partition, the reading occurring using a second data communication path configured for paging a second memory data; and using the portion of the memory data for executing a migrated application.

2. The computer implemented method of claim 1, wherein the portion of the memory data is one of (i) all and (ii) a part of the memory data.

3. The computer implemented method of claim 1, wherein the data storage unit is a paging space, and wherein the paging space is accessible from the source logical partition and the destination logical partition.

4. The computer implemented method of claim 1, further comprising:

paging in the portion of the memory data from the first paging space.

5. The computer implemented method of claim 1, further comprising:

paging out the portion of the memory data to the second paging space.

6. The computer implemented method of claim 1, wherein the writing uses a third data communication path configured for paging the memory data to the shared area of the data storage unit, and wherein the reading uses a fourth data communication path configured for paging the second memory data to the shared area of the data storage unit.

7. A data processing system for migrating memory data between partitions, the data processing system comprising:

a storage device including a storage medium, wherein the storage device stores computer usable program code; and a processor, wherein the processor executes the computer usable program code, and wherein the computer usable program code comprises:

computer usable code for writing a portion of a memory data of a source logical partition to a data storage unit, the writing occurring using a first data communication path configured for paging the memory data, wherein the data storage unit is a shared area of a data storage unit that is distinct from a first paging space of the source logical partition and from a second paging space of the destination logical partition, and wherein the shared area of the data storage unit is accessible from the source logical partition and the destination logical partition;

computer usable code for reading the portion of the memory data from the data storage unit at a destination logical partition, the reading occurring using a second data communication path configured for paging a second memory data; and computer usable code for using the portion of the memory data for executing a migrated application.

8. The data processing system of claim 7, wherein the portion of the memory data is one of (i) all and (ii) a part of the memory data.

9. The data processing system of claim 7, wherein the data storage unit is a paging space, and wherein the paging space is accessible from the source logical partition and the destination logical partition.

10. The data processing system of claim 7, further comprising:

computer usable code for paging in the portion of the memory data from the first paging space.

11. The data processing system of claim 10, wherein the computer usable code for writing uses a third data communication path configured for paging the memory data to the shared area of the data storage unit, and wherein the computer usable code for reading uses a fourth data communication path configured for paging the second memory data to the shared area of the data storage unit.

12. The data processing system of claim 7, further comprising:

computer usable code for paging out the portion of the memory data to the second paging space.

13. A computer usable program product comprising a computer usable storage medium including computer usable code for migrating memory data between partitions, the computer usable code comprising:

computer usable code for writing a portion of a memory data of a source logical partition to a data storage unit, the writing occurring using a first data communication path configured for paging the memory data, wherein the data storage unit is a shared area of a data storage unit that is distinct from a first paging space of the source logical partition and from a second paging space of the destination logical partition, and wherein the shared area of the data storage unit is accessible from the source logical partition and the destination logical partition;

computer usable code for reading the portion of the memory data from the data storage unit at a destination logical partition, the reading occurring using a second data communication path configured for paging a second memory data; and computer usable code for using the portion of the memory data for executing a migrated application.

14. The computer usable program product of claim 13, wherein the portion of the memory data is one of (i) all and (ii) a part of the memory data.

15. The computer usable program product of claim 13, wherein the data storage unit is a paging space, and wherein the paging space is accessible from the source logical partition and the destination logical partition.

16. The computer usable program product of claim 13, further comprising:

computer usable code for paging in the portion of the memory data from the first paging space.

17. The computer usable program product of claim 13, further comprising:

computer usable code for paging out the portion of the memory data to the second paging space.

18. The computer usable program product of claim 13, wherein the computer usable code for writing uses a third data communication path configured for paging the memory data to the shared area of the data storage unit, and wherein the computer usable code for reading uses a fourth data communication path configured for paging the second memory data to the shared area of the data storage unit.

* * * * *